(12) United States Patent
Vaidyanathan et al.

(10) Patent No.: US 8,862,905 B2
(45) Date of Patent: Oct. 14, 2014

(54) COLLECTING AND ANALYSING TELEMETRY DATA TO DYNAMICALLY CAP POWER AND TEMPERATURE OF A COMPUTER SYSTEM BY SPECIFYING VIRTUAL DUTY CYCLES FOR PROCESSES EXECUTING ON A PROCESSOR

(75) Inventors: Kalyanaraman Vaidyanathan, San Diego, CA (US); Kenny C. Gross, San Diego, CA (US); David B. Elting, San Diego, CA (US); David Belanger, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 13/029,843

(22) Filed: Feb. 17, 2011

(65) Prior Publication Data

US 2012/0216200 A1    Aug. 23, 2012

(51) Int. Cl.
| | |
|---|---|
| *G06F 1/00* | (2006.01) |
| *G06F 9/46* | (2006.01) |
| *G06F 1/20* | (2006.01) |
| *G06F 9/50* | (2006.01) |
| *G06F 1/32* | (2006.01) |
| *G06F 11/30* | (2006.01) |

(52) U.S. Cl.
CPC ........... *G06F 9/5094* (2013.01); *Y02B 60/1275* (2013.01); *G06F 1/206* (2013.01); *G06F 1/3206* (2013.01); *G06F 11/3062* (2013.01); *G06F 11/3096* (2013.01)
USPC .......................................... 713/300; 718/100

(58) Field of Classification Search
CPC ....................................................... G06F 1/206
USPC ........................................................... 718/100
See application file for complete search history.

(56) References Cited

U.S. PATENT DOCUMENTS

| | | | |
|---|---|---|---|
| 2004/0268171 A1* | 12/2004 | Inoue et al. | 713/323 |
| 2006/0116844 A1* | 6/2006 | Gaur et al. | 702/130 |
| 2009/0006873 A1* | 1/2009 | Bellofatto et al. | 713/310 |
| 2009/0271643 A1* | 10/2009 | Vaidyanathan et al. | 713/320 |
| 2010/0037078 A1* | 2/2010 | Gross et al. | 713/340 |
| 2010/0042996 A1* | 2/2010 | Corry et al. | 718/100 |
| 2010/0292959 A1* | 11/2010 | Gross et al. | 702/181 |

* cited by examiner

*Primary Examiner* — Thomas Lee
*Assistant Examiner* — Robert Cassity
(74) *Attorney, Agent, or Firm* — Park, Vaughan, Fleming & Dowler LLP; Chia-Hsin Suen

(57) ABSTRACT

The disclosed embodiments provide a system that analyzes telemetry data from a computer system. During operation, the system obtains the telemetry data as a set of telemetric signals using a set of sensors in the computer system. Next, the system analyzes the telemetry data to estimate a value of a parameter associated with the computer system, wherein the parameter is at least one of a power utilization and a temperature. Finally, the system controls a subsequent value of the parameter by modulating a virtual duty cycle of a processor in the computer system based on the estimated value.

20 Claims, 6 Drawing Sheets

COLLECTING AND ANALYSING TELEMETRY DATA TO DYNAMICALLY CAP POWER AND TEMPERATURE OF A COMPUTER SYSTEM BY SPECIFYING VIRTUAL DUTY CYCLES FOR PROCESSES EXECUTING ON A PROCESSOR

BACKGROUND

1. Field

The present embodiments relate to techniques for monitoring and analyzing computer systems. More specifically, the present embodiments relate to a method and system for dynamically capping the power utilization and/or temperature of the computer system through analysis of telemetry data from the computer system.

2. Related Art

As electronic commerce becomes more prevalent, businesses are increasingly relying on enterprise computer systems to process ever-larger volumes of electronic transactions. Such enterprise computer systems are typically mounted in racks and housed in data centers. To ensure proper and continuous functioning of the computer systems, the data centers may include both main and backup power, as well as environmental controls such as air conditioning and fire protection systems.

At the same time, increasing densities of both components and rack-based computer systems in data centers have resulted in greater demand for both power and temperature control within the data centers. To meet such demand, newer computer systems often provide dynamic voltage and frequency scaling (DVFS) mechanisms that allow the operating voltages and/or frequencies of individual processors to be scaled up or down to meet power and/or temperature limits for the computer systems.

However, DVFS requires support from both the hardware and operating system (OS) of a computer system. Consequently, legacy computer systems that do not include DVFS support may lack the ability to regulate power utilization and/or temperature. Furthermore, DVFS implementations typically restrict each processor to one of a small number (e.g., 6, or 8) of discrete operating states, thus precluding fine-grained tuning of temperature, power utilization, and/or workload execution on the processor.

Hence, data center operation and usage may be facilitated by mechanisms that enable precise management of power utilization, temperature, and/or workload execution in both legacy and newer computer systems.

SUMMARY

The disclosed embodiments provide a system that analyzes telemetry data from a computer system. During operation, the system obtains the telemetry data as a set of telemetric signals using a set of sensors in the computer system. Next, the system analyzes the telemetry data to estimate a value of a parameter associated with the computer system, wherein the parameter is at least one of a power utilization and a temperature. Finally, the system controls a subsequent value of the parameter by modulating a virtual duty cycle of a processor in the computer system based on the estimated value.

In some embodiments, the system also generates an alert if the telemetry data indicate a degradation risk in the computer system.

In some embodiments, the power utilization is estimated from the telemetry data using a power-utilization model for the computer system.

In some embodiments, the temperature is estimated by:
(i) obtaining a set of temperature signals from the telemetry data;
(ii) dequantizing the temperature signals; and
(iii) validating the temperature signals using a nonlinear, nonparametric regression technique.

In some embodiments, controlling the subsequent value of the parameter involves capping the parameter at a pre-specified threshold.

In some embodiments, modulating the virtual duty cycle of the processor in the computer system involves generating a control signal based on the estimated value of the parameter and one or more control settings associated with the parameter, and sending the control signal to an operating system of the computer system. The control signal continuously switches the processor between an idle state and an active state to modulate the virtual duty cycle of the processor.

In some embodiments, the control signal manages use of the processor by at least one of a process, a user, and an application.

In some embodiments, the telemetric signals include at least one of a load metric, a CPU utilization, an idle time, a memory utilization, a disk activity, a transaction latency, a temperature, a voltage, a fan speed and a current.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
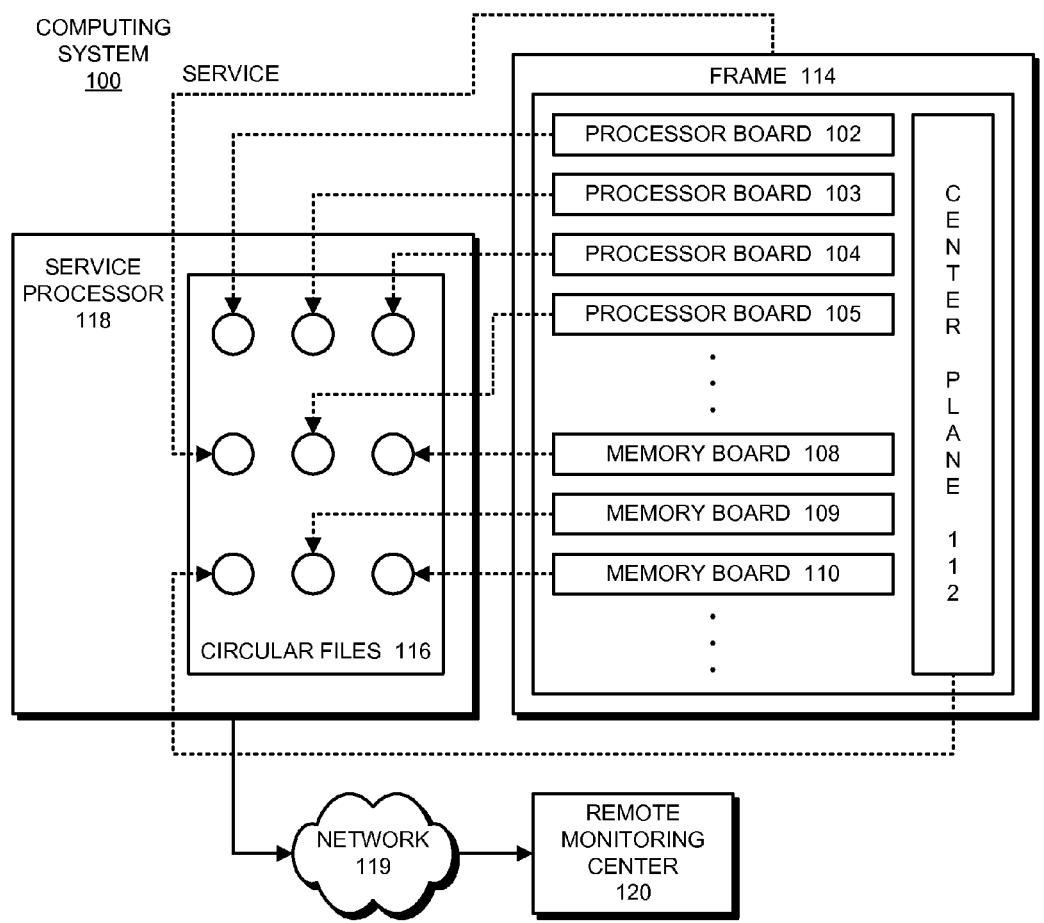
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIGS. 2-3. The system of FIG. 1 is described further in U.S. Pat. No. 7,020,802, (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
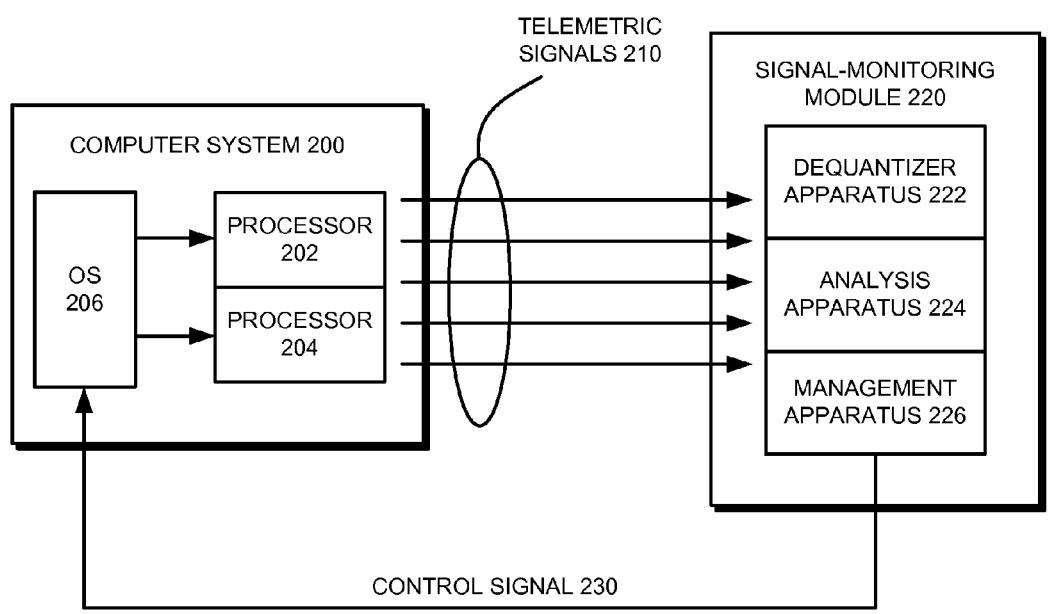
FIG. 2 shows a telemetry analysis system which examines both short-term real-time telemetry data and long-term historical telemetry data in accordance with an embodiment.

FIG. 2 shows a telemetry analysis system which examines both short-term real-time telemetry data and long-term historical telemetry data in accordance with an embodiment. In this example, a computer system 200 is monitored using a number of telemetric signals 210, which are transmitted to a signal-monitoring module 220. Signal-monitoring module 220 may assess the state of computer system 200 using telemetric signals 210. For example, signal-monitoring module 220 may analyze telemetric signals 210 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetric signals 210 from computer system 200 over a network connection. Moreover, signal-monitoring module 220 may include functionality to analyze both real-time telemetric signals 210 and long-term historical telemetry data. For example, signal-monitoring module 220 may be used to detect anomalies in telemetric signals 210 received directly from the monitored computer system(s). Signal-monitoring module 220 may also be used in offline detection of anomalies from the monitored computer system(s) by processing archived and/or compressed telemetry data associated with the monitored computer system(s).

Those skilled in the art will appreciate that computer system 200 may include a variety of hardware and/or software configurations. For example, computer system 200 may correspond to a new computer system with a recently released operating system (OS) 206 and high-performance processors 202-204, memory, storage, and/or cooling components. On the other hand, computer system 200 may be a legacy computer system with an older OS 206 and/or components.

In turn, the components and/or OS 206 of computer system 200 may affect the operation, maintenance and/or management of computer system 200. More specifically, a newer computer system may be faster, more efficient, and/or more configurable than a legacy computer system. For example, the newer computer system may include functionality to limit power dissipation and/or heat generation on a per-processor basis through dynamic voltage and frequency scaling (DVFS), while the legacy computer system may not support DVFS and thus lack a mechanism for regulating power utilization and/or temperature.

The inability to regulate power utilization and/or temperature may additionally interfere with the operation of data centers that contain legacy computer systems. Within such data centers, unregulated power consumption may trip circuit breakers that bring down entire racks of servers and/or exceed power limits included in flat-rate contracts with electrical utilities, while excessive heat generation may increase the data centers' cooling requirements and/or cause the computer systems' temperatures to surpass operating limits. In other words, the lack of power and/or temperature management in the legacy computer systems may cause problems with reliability, availability, cooling, energy use, and/or cost provisioning in the data centers.

In one or more embodiments, signal-monitoring module 220 includes functionality to dynamically manage the power utilization and/or temperature of computer system 200, even if computer system 200 does not support DVFS. For example, signal-monitoring module 220 may be used to cap the power utilization and/or temperature of a legacy server computer at a pre-specified threshold to reduce electrical and thermal costs associated with operating the server computer in a data center.

In one or more embodiments, the functionality of signal-monitoring module 220 is enabled through the processing and/or analysis of telemetric signals 210. Telemetric signals 210 may correspond to load metrics, CPU utilizations, idle times, memory utilizations, disk activity, transaction latencies, temperatures, voltages, fan speeds, and/or currents.

In particular, one or more components of signal-monitoring module 220 may analyze telemetric signals 210 to estimate a value of a parameter associated with computer system 200. As mentioned previously, the parameter may correspond to the power utilization and/or temperature of computer system 200. To estimate the power utilization of computer system 200, an analysis apparatus 224 in signal-monitoring module 220 may analyze telemetric signals 210 using a power-utilization model for computer system 200. Estimation of power utilization using a power-utilization model is described in U.S. Pat. No. 7,756,652, (issued Jul. 13, 2010), by inventors Andrew J. Lewis, Kalyanamaran Vaidyanathan, and Kenny C. Gross, entitled "Estimating a Power Utilization of a Computer System," which is incorporated herein by reference. Alternatively, analysis apparatus 224 may obtain the power utilization of computer system 200 from a device such as a power meter.

On the other hand, temperature signals from telemetric signals 210 may be used to estimate the temperature of computer system 200. The temperature signals may be obtained from sensors that measure the temperatures of components (e.g., processors 202-204) in computer system 200, as well as sensors that measure the ambient temperature(s) around computer system 200. As a result, the estimated temperature of computer system 200 may correspond to the temperature of a component in computer system 200, the ambient temperature around computer system 200, and/or a set of temperature signals obtained from temperature sensors in and around computer system 200.

To produce a temperature estimate from the temperature signals, a dequantizer apparatus 222 in signal-monitoring module 220 may remove quantization effects associated with low-resolution (e.g., 8-bit) analog-to-digital (A/D) conversion of high-resolution signals from the temperature signals. The functionality of dequantizer apparatus 222 is described in U.S. Pat. No. 7,248,980, (issued Jul. 24, 2007), by inventors Kenny C. Gross, Ramakrishna C. Dhanekula, Eugenio J. Schuster, and Gregory A. Cumberford, entitled "Method and Apparatus for Removing Quantization Effects in a Quantization Signal," which is incorporated herein by reference.

Next, analysis apparatus 224 may validate the temperature signals using a nonlinear, nonparametric regression technique. The validation may compare the dequantized temperature signals with fan speed signals from telemetric signals 210 to verify that temperature sensors in computer system 200 are operable. For example, analysis apparatus 224 may verify that the temperature sensors have not degraded and/or drifted out of calibration using the temperature and fan speed signals.

In one or more embodiments, the nonlinear, nonparametric regression technique used by analysis apparatus 224 corresponds to a multivariate state estimation technique (MSET). Analysis apparatus 224 may be trained using historical telemetry data from computer system 200 and/or similar computer systems. The historical telemetry data may be used to determine correlations among various telemetric signals 210 collected from the monitored computer system(s) and to enable accurate verification of various real-time telemetric signals 210 (e.g., temperature signals).

To validate telemetric signals 210 using MSET, analysis apparatus 224 may generate estimates of telemetric signals 210 based on the current set of telemetric signals 210. Analysis apparatus 224 may then obtain residuals by subtracting the estimated telemetric signals from the measured telemetric signals 210. The residuals may represent the deviation of computer system 200 from known operating configurations of computer system 200. As a result, analysis apparatus 224 may validate telemetric signals 210 by analyzing the residuals over time, with changes in the residuals representing degradation and/or decalibration drift in the sensors.

For example, analysis apparatus 224 may use MSET to generate, from telemetric signals 210, 16, sets of estimated telemetric signals representing 16, possible combinations of processor states (e.g., in processors 202-204) in computer system 200. Analysis apparatus 224 may also calculate 16, sets of residuals by subtracting telemetric signals 210 from each set of estimated telemetric signals. Because telemetric signals 210 should correspond to one of the 16, possible configurations in computer system 200, one set of residuals should be consistent with normal signal behavior in the corresponding configuration (e.g., normally distributed with a mean of 0). On the other hand, the other 15, sets of residuals may indicate abnormal signal behavior (e.g., nonzero mean, higher or lower variance, etc.) because telemetric signals 210 do not match the estimated (e.g., characteristic) telemetric signals for the remaining three PSU configurations. Moreover, if abnormal signal behavior is found in all 16, sets of residuals, degradation and/or decalibration drift may be present in one or more sensors. Consequently, the temperature signals may be valid if one set of residuals represents normal signal behavior and invalid if none of the residuals represents normal signal behavior.

In one or more embodiments, the nonlinear, nonparametric regression technique used in analysis apparatus 224 may refer to any number of pattern-recognition algorithms. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern-recognition approaches. Hence, the term "MSET" as used in this specification can refer to (among other things) any 25, techniques outlined in [Gribok], including Ordinary Least Squares (OLS), Support Vector Machines (SVM), Artificial Neural Networks (ANNs), MSET, or Regularized MSET (RMSET).

A management apparatus 226 in signal-monitoring module 220 may then use the estimated value of the parameter (e.g., power utilization and/or temperature) to control subsequent values of the parameter by modulating a "virtual duty cycle" of a processor (e.g., processors 202-204) in computer system 200. More specifically, management apparatus 226 may generate a control signal 230 based on the estimated value and one or more control settings associated with the parameter. For example, the control settings may dictate changes to the processor's virtual duty cycle based on the estimated value of the processor's power utilization and/or temperature.

Management apparatus 226 may then send control signal 230 to OS 206 to modulate the virtual duty cycle of the processor. In particular, control signal 230 may cause OS 206 to continuously switch the processor between an idle state and an active state. Furthermore, such switching may occur at a high (e.g., kHz or MHz) frequency and a latency that is less than the period between observations of telemetric signals 210 by sensors in computer system 200.

In other words, control signal 230 may regulate the power utilization and/or temperature of the processor by issuing OS commands that periodically and rapidly toggle the processor between a 0% load and a 100% load. The virtual duty cycle of the processor may correspond to the fraction of time in which the processor is at 100% load and may be directly proportional to the power utilization and/or temperature of the processor. Consequently, management apparatus 226 may decrease the virtual duty cycle to decrease the power utilization and/or temperature of the processor and increase the virtual duty cycle to increase the power utilization and/or temperature of the processor.

In one or more embodiments, management apparatus 226 controls subsequent values of the parameter by capping the parameter at a pre-specified limit. For example, management apparatus 226 may cap the power utilization of the processor to prevent excessive power consumption from tripping a circuit breaker and/or triggering a sharp increase in the cost of powering computer system 200. Similarly, management apparatus 226 may cap the temperature of the processor to reduce cooling costs for computer system 200 and/or prevent components in computer system 200 from overheating. Power and temperature capping are discussed in further detail below with respect to FIGS. 3-4.

As described above, management apparatus 226 may generate control signal 230 based on one or more control settings that update the processor's virtual duty cycle in response to the processor's estimated power utilization and/or temperature. Management apparatus 226 may also use the control settings to manage use of the processor by individual processes, users, and/or applications. For example, the control settings may regulate the utilization of the processor on a per-process basis by specifying a maximum virtual duty cycle for each process executing on the processor. Moreover, the process's maximum virtual duty cycle may be based on the power-utilization constraints and/or level of access (e.g., subscription level) associated with the application and/or user owning the process.

Because management apparatus 226 uses OS-level commands to switch the processor between loaded and unloaded states, management apparatus 226 may effectively regulate the power utilization and/or temperature of the processor and/or computer system 200 without modifying the hardware and/or software of computer system 200 (e.g., to support DVFS). At the same time, the dynamic and frequent adjustment of virtual duty cycles by management apparatus 226 may enable finer-grained control of power utilization and/or temperature than DVFS mechanisms that typically support a small number (e.g., 6-8) of discrete processor states. Finally, virtual-duty-cycle modulation may be customized for individual processes in computer system 200 to prioritize workloads, users, and/or applications based on the performance levels and/or cost constraints associated with each workload, user, and/or application.

Figure 3:
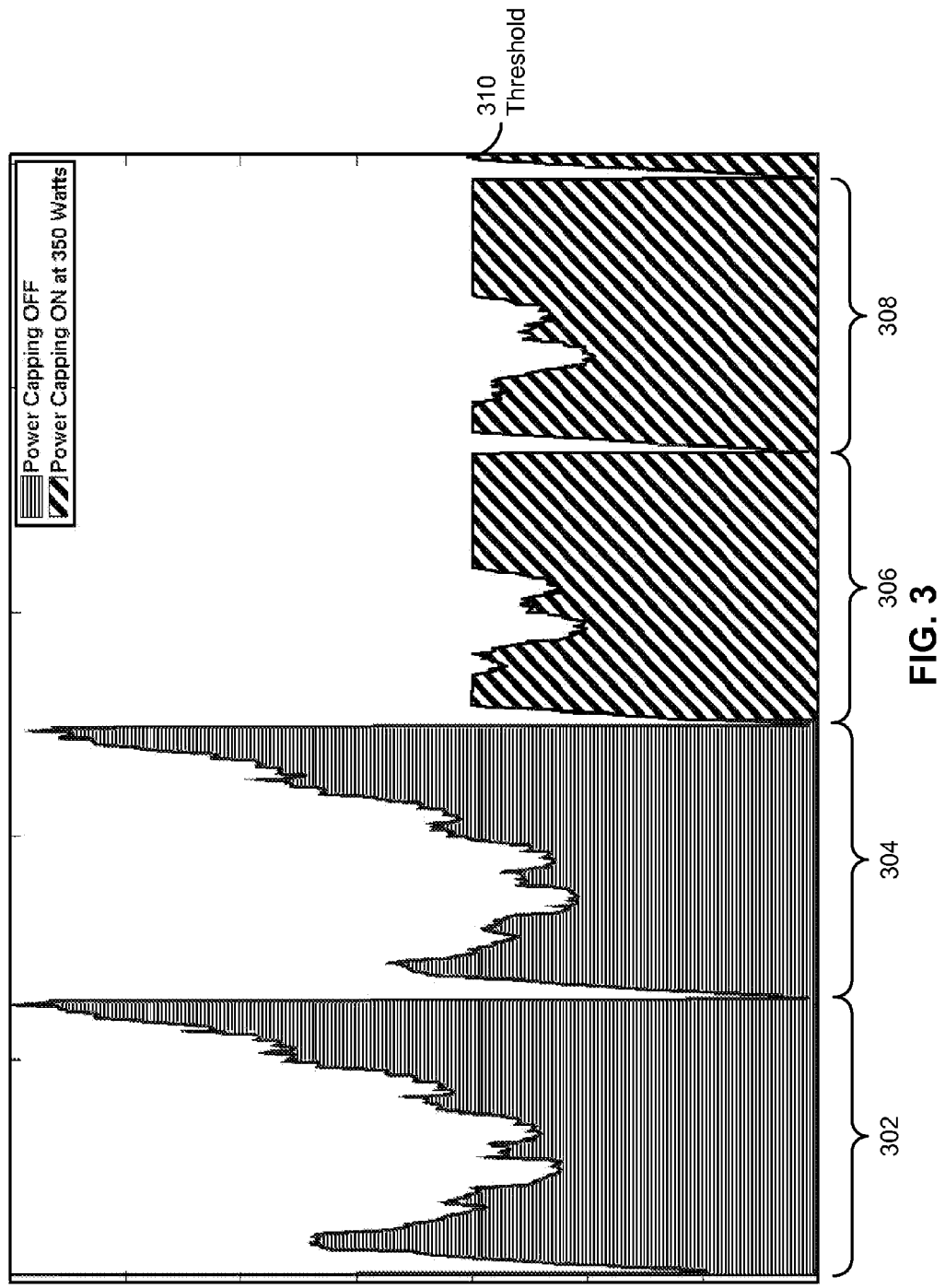
FIG. 3 shows an exemplary plot in accordance with an embodiment.

FIG. 3 shows an exemplary plot in accordance with an embodiment. More specifically, FIG. 3 shows a plot of power utilization in a computer system over time. As shown in FIG. 3, the power utilization fluctuates periodically in response to the execution of four workloads 302-308 on the computer system. In addition, the first two workloads 302-304 have a much wider range and variance of power utilization values than the last two workloads 306-308 because the power utilization of the computer system is capped at a pre-specified threshold 310 (e.g., 350, watts) during the execution of workloads 306-308. Such capping may be performed by a signal-monitoring module, such as signal-monitoring module 220 of FIG. 2.

To cap power utilization during workloads 306-308, the signal-monitoring module may estimate the power utilization by using a power-utilization model to process a set of telemetric signals from the computer system. Next, the signal-monitoring module may generate a control signal based on the estimated power utilization and one or more control settings for managing the computer system's power utilization. The signal-monitoring module may then send the control signal to the operating system of the computer system to control the computer system's subsequent power utilization. As mentioned above, the control signal may continuously switch a processor in the computer system between an idle state and an active state. The control signal may thus increase the processor's idle time (e.g., lower the processor's virtual duty cycle) to reduce the power utilization of the computer system. Conversely, the control signal may increase the processor's active time (e.g., raise the processor's virtual duty cycle) to increase the power utilization of the computer system.

The signal-monitoring module may continue varying the processor's virtual duty cycle based on new estimates of the computer system's power utilization. Consequently, the signal-monitoring module may implement a feedback loop that enables precise power capping through frequent updates to the estimated power utilization of the computer system and to the corresponding virtual duty cycle of the processor.

Figure 4:
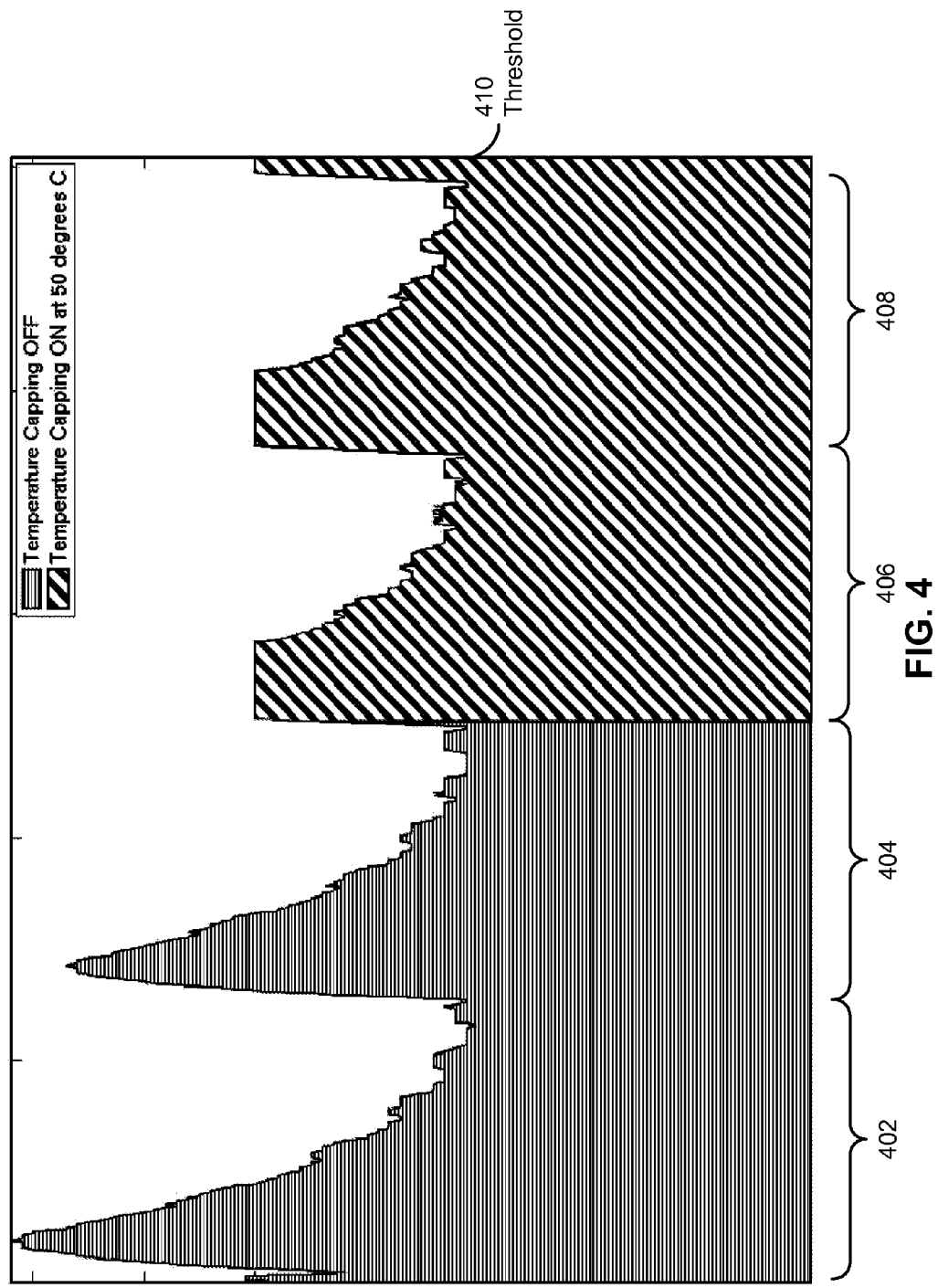
FIG. 4 shows an exemplary plot in accordance with an embodiment.

FIG. 4 shows an exemplary plot in accordance with an embodiment. More specifically, FIG. 4 shows a plot of temperature in a computer system over time. As with the power utilization of FIG. 3, the temperature fluctuates periodically based on the processing of four workloads 402-408 by the computer system. Workloads 402-404 are associated with a much wider range and variance of temperatures than workloads 406-408 because the temperature of the computer system is capped at a pre-specified threshold 410 (e.g., 50, degrees C.) during workloads 406-408.

To cap the temperature of the computer system, a signal-monitoring module (e.g., signal-monitoring module 220 of FIG. 2) may estimate the temperature by obtaining a set of temperature signals from the computer system, dequantizing the temperature signals, and validating the temperature signals using a nonlinear, nonparametric regression technique such as MSET. Next, the signal-monitoring module may generate a control signal that modulates a virtual duty cycle of a processor in the computer system based on the estimated temperature and one or more control settings for managing the computer system's temperature. The signal-monitoring module may then implement a feedback loop by continuously sending the control signal to the operating system of the computer system, obtaining a new temperature estimate from a new set of temperature signals, and updating the control signal in response to the new temperature estimate.

Figure 5:
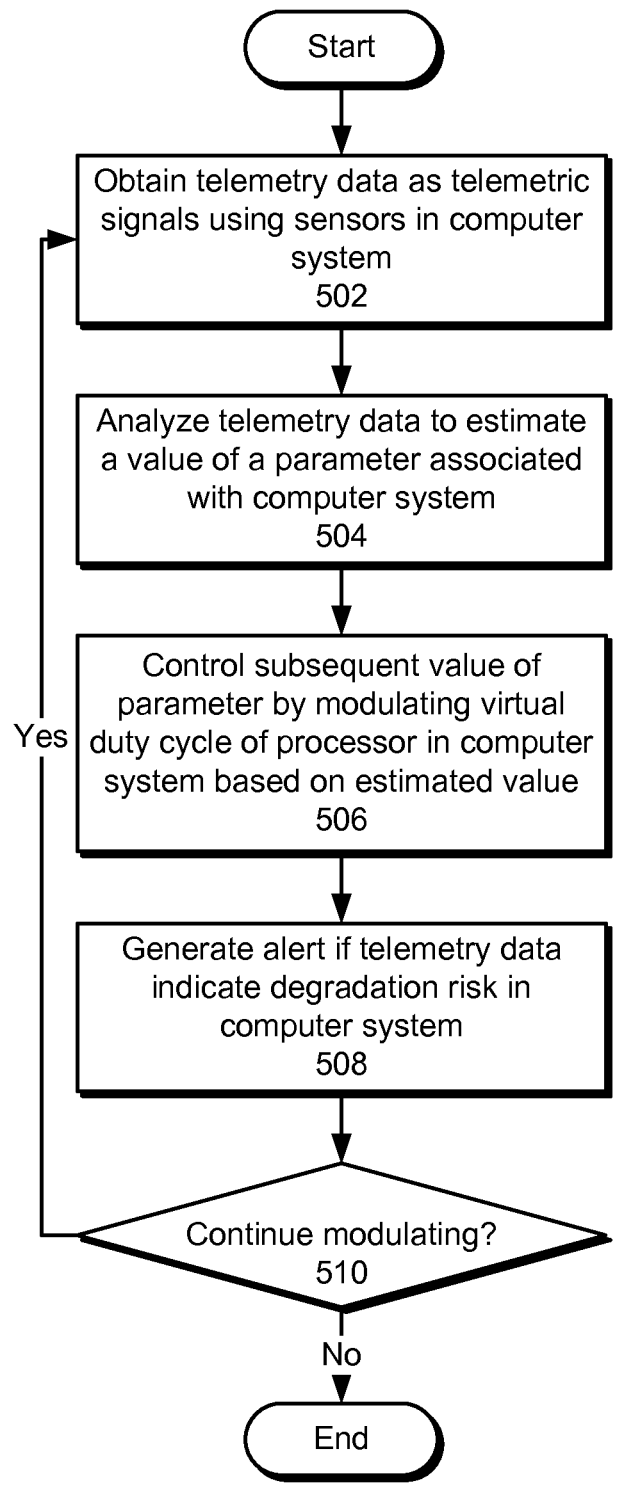
FIG. 5 shows a flowchart illustrating the process of analyzing telemetry data from a computer system in accordance with an embodiment.

FIG. 5 shows a flowchart illustrating the process of analyzing telemetry data from a computer system in accordance with an embodiment. In one or more embodiments, one or more of the steps may be omitted, repeated, and/or performed in a different order. Accordingly, the specific arrangement of steps shown in FIG. 5 should not be construed as limiting the scope of the technique.

Initially, the telemetry data is obtained as a set of telemetric signals using a set of sensors in the computer system (operation 502). The telemetric signals may include load metrics, CPU utilizations, idle times, memory utilizations, disk activity, transaction latencies, temperatures, voltages, fan speeds, and/or currents. Next, the telemetry data is analyzed to estimate a value of a parameter associated with the computer system (operation 504). For example, the telemetry data may be processed using a power-utilization model to estimate the power utilization of the computer system. On the other hand, temperature signals from the telemetric signals may be dequantized and validated to estimate the temperature of the computer system.

A subsequent value of the parameter is controlled by modulating a virtual duty cycle of a processor in the computer system based on the estimated value (operation 506). For example, the virtual duty cycle may be raised to increase the power utilization and/or temperature of the computer system and lowered to reduce the power utilization and/or temperature of the computer system.

An alert may also be generated if the telemetry data indicate a degradation risk in the computer system (operation 508). For example, an alert may be generated if analysis of the telemetry data indicates the presence of a degrading component and/or faulty sensor in the computer system.

Modulation of the virtual duty cycle may continue (operation 510) in a feedback loop as long as the parameter is to be managed in the computer system. For example, the virtual duty cycle may continue to be modulated to cap the power utilization and/or temperature of the computer system at a pre-specified threshold. As a result, telemetry data may be continuously obtained (operation 502), analyzed (operation 504), and used to control subsequent values of the parameter (operation 506) and generate alerts (operation 508) during the lifetime of the computer system.

Figure 6:
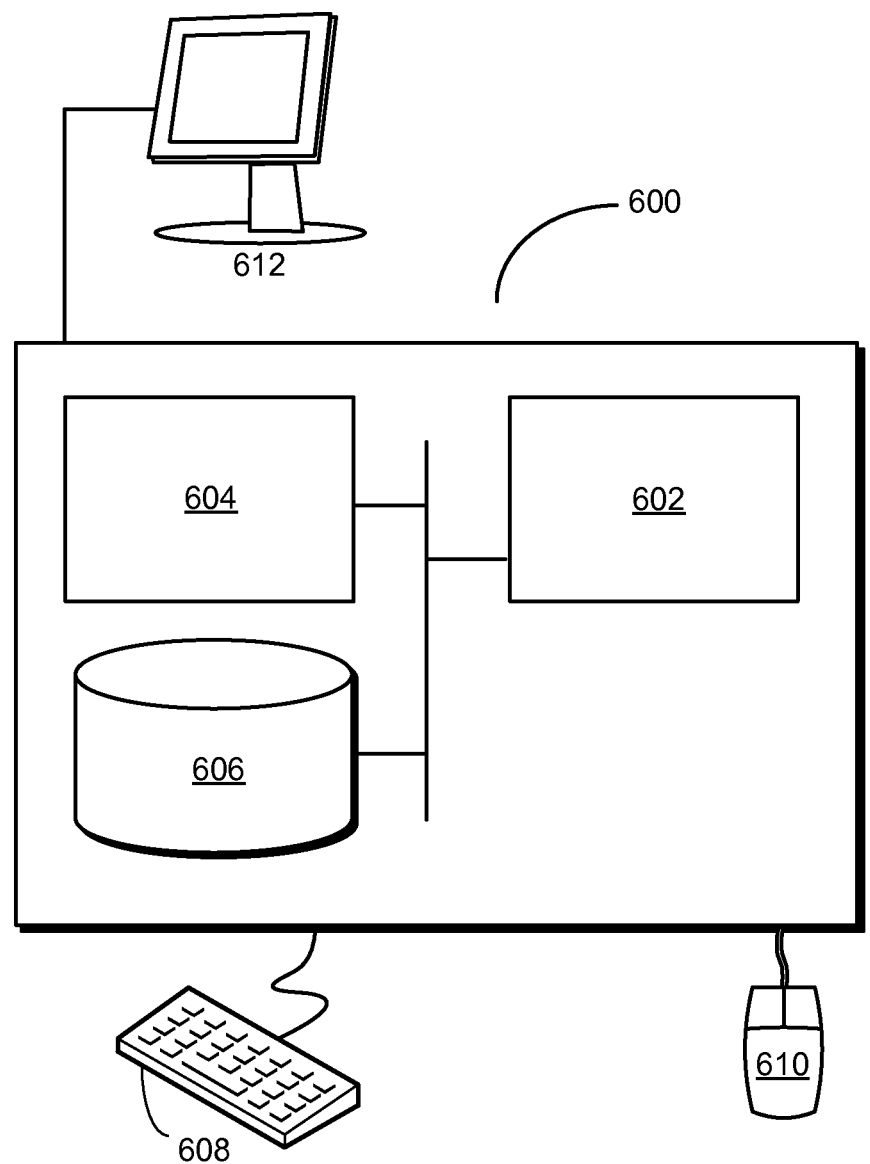
FIG. 6 shows a computer system in accordance with an embodiment.

FIG. 6 shows a computer system 600. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an OS (not shown) that coordinates the use of hardware and software resources on computer system 600, as well as one or more applications that perform specialized tasks for the user. To perform tasks for the user, applications may obtain the use of hardware resources on computer system 600 from the OS, as well as interact with the user through a hardware and/or software framework provided by the OS.

In particular, computer system 600 may implement a signal-monitoring module that analyzes telemetry data from a monitored system. The signal-monitoring module may analyze the telemetry data to estimate a value of a parameter associated with the monitored system, such as a power utilization and/or a temperature. The signal-monitoring module may then control a subsequent value of the parameter by modulating a virtual duty cycle of a processor in the monitored system based on the estimated value. For example, the signal-monitoring module may generate a control signal that continuously switches the processor between an idle state and an active state to modulate the virtual duty cycle of the processor.

In addition, one or more components of computer system 600 may be remotely located and connected to the other components over a network. Portions of the present embodiments (e.g., monitoring mechanism, signal-monitoring module, dequantizer apparatus, analysis apparatus, management apparatus, etc.) may also be located on different nodes of a distributed system that implements the embodiments. For example, the present embodiments may be implemented using a cloud computing system that provides a remote monitoring and analysis framework for a set of computer servers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
   obtaining telemetry data using a set of sensors for a computer system;
   analyzing the telemetry data to estimate a value of a parameter for the computer system that is at least one of a power utilization and a temperature; and
   controlling a subsequent value of the parameter by regulating utilization of a processor in the computer system on a per process basis based on the estimated value, wherein regulating the utilization comprises, for each process in a set of processes that are executing on the processor:
   specifying a different maximum for a virtual duty cycle for the process than for one or more other processes in the set based on the estimated value; and
   modulating the virtual duty cycle for the process separately from virtual duty cycles for the one or more other processes by causing the processor to toggle from operating between a 0% load and a 100% load for the process, wherein a fraction of time in which the processor is at the 100% load is based on the maximum for the virtual duty cycle for the process.

2. The computer-implemented method of claim 1, further comprising:
   generating an alert if the telemetry data indicate a degradation risk in the computer system.

3. The computer-implemented method of claim 1, wherein the power utilization is estimated from the telemetry data using a power-utilization model for the computer system.

4. The computer-implemented method of claim 1, wherein the temperature is estimated by:
   obtaining a set of temperature signals from the telemetry data;
   dequantizing the temperature signals; and
   validating the temperature signals using a nonlinear, non-parametric regression technique.

5. The computer-implemented method of claim 1, wherein controlling the subsequent value of the parameter involves:
   capping the parameter at a pre-specified threshold.

6. The computer-implemented method of claim 1, wherein obtaining the telemetry data comprises obtaining a set of telemetric signals that comprise at least one of:
   a load metric;
   a CPU utilization;
   an idle time;
   a memory utilization;
   a disk activity;
   a transaction latency;
   a temperature;
   a voltage;
   a fan speed; and
   a current.

7. A system comprising:
   a processor;

a monitoring mechanism configured to obtain telemetry data using a set of sensors for a computer system; and a signal-monitoring module configured to:
analyze the telemetry data to estimate a value of a parameter for the computer system that is at least one of a power utilization and a temperature; and
control a subsequent value of the parameter by regulating utilization of a processor in the computer system on a per process basis based on the estimated value, wherein regulating the utilization comprises, for each process in a set of processes that are executing on the processor:
specifying a different maximum for a virtual duty cycle for the process than for one or more other processes in the set based on the estimated value; and
modulating the virtual duty cycle for the process separately from virtual duty cycles for the one or more other processes by causing the processor to toggle from operating between a 0% load and a 100% load for the process, wherein a fraction of time in which the processor is at the 100% load is based on the maximum for the virtual duty cycle for the process.

8. The system of claim 7, further comprising a management apparatus configured to:
generate an alert if the telemetry data indicate a degradation risk in the computer system.

9. The system of claim 7, wherein the power utilization is estimated from the telemetry data using a power-utilization model for the computer system.

10. The system of claim 7, wherein the temperature is estimated by:
obtaining a set of temperature signals from the telemetry data;
dequantizing the temperature signals; and
validating the temperature signals using a nonlinear, non-parametric regression technique.

11. A non-transitory computer-readable storage medium storing instructions that when executed by a computer cause:
obtaining telemetry data using a set of sensors for a computer system;
analyzing the telemetry data to estimate a value of a parameter for the computer system that is at least one of a power utilization and a temperature; and
controlling a subsequent value of the parameter by regulating utilization of a processor in the computer system on a per process basis based on the estimated value, wherein regulating the utilization comprises, for each process in a set of processes that are executing on the processor:
specifying a different maximum for a virtual duty cycle for the process than for one or more other processes in the set based on the estimated value; and
modulating the virtual duty cycle for the process separately from virtual duty cycles for the one or more other processes by causing the processor to toggle from operating between a 0% load and a 100% load for the process, wherein a fraction of time in which the processor is at the 100% load is based on the maximum for the virtual duty cycle for the process.

12. The computer-readable storage medium of claim 11, wherein the power utilization is estimated from the telemetry data using a power-utilization model for the computer system.

13. The computer-readable storage medium of claim 11, wherein the temperature is estimated by:
obtaining a set of temperature signals from the telemetry data;
dequantizing the temperature signals; and
validating the temperature signals using a nonlinear, non-parametric regression technique.

14. The computer-implemented method of claim 1, further comprising:
generating a control signal based on the estimated value of the parameter and one or more control settings associated with the parameter; and
sending the control signal to an operating system of the computer system, wherein the control signal causes the processor to toggle from operating between the 0% load to the 100% load.

15. The computer-implemented method of claim 14, wherein the control signal manages use of the processor by at least one of a process, a user, and an application.

16. The system of claim 7, wherein the signal-monitoring module is further configured to:
generate a control signal based on the estimated value of the parameter and one or more control settings associated with the parameter; and
send the control signal to an operating system of the computer system,
wherein the control signal causes the processor to toggle from operating between the 0% load to the 100% load.

17. The computer-readable storage medium of claim 11, wherein the instructions further cause:
generating a control signal based on the estimated value of the parameter and one or more control settings associated with the parameter; and
sending the control signal to an operating system of the computer system,
wherein the control signal causes the processor to toggle from operating between the 0% load to the 100% load.

18. The system of claim 7, wherein controlling the subsequent value of the parameter involves capping the parameter at a pre-specified threshold.

19. The system of claim 16, wherein the control signal manages use of the processor by at least one of a process, a user, and an application.

20. The computer-readable storage medium of claim 17, wherein the control signal manages use of the processor by at least one of a process, a user, and an application.

* * * * *

UNITED STATES PATENT AND TRADEMARK OFFICE
CERTIFICATE OF CORRECTION

PATENT NO. : 8,862,905 B2  Page 1 of 1
APPLICATION NO. : 13/029843
DATED : October 14, 2014
INVENTOR(S) : Vaidyanathan et al.

It is certified that error appears in the above-identified patent and that said Letters Patent is hereby corrected as shown below:

In the Specification

In column 1, line 42, delete "(e.g., 6, or 8)" and insert -- (e.g., 6 or 8) --, therefor.

In column 3, line 67, delete "7,020,802," and insert -- 7,020,802 --, therefor.

In column 5, line 22, delete "7,756,652," and insert -- 7,756,652 --, therefor.

In column 5, line 47, delete "7,248,980," and insert -- 7,248,980 --, therefor.

In column 6, line 15, delete "16," and insert -- 16 --, therefor.

In column 6, line 16, delete "16," and insert -- 16 --, therefor.

In column 6, line 18, delete "16," and insert -- 16 --, therefor.

In column 6, line 21, delete "16," and insert -- 16 --, therefor.

In column 6, line 25, delete "15," and insert -- 15 --, therefor.

In column 6, line 30, delete "16," and insert -- 16 --, therefor.

In column 6, line 47, delete "25," and insert -- 25 --, therefor.

In column 8, line 1, delete "(e.g., 350, watts)" and insert -- (e.g., 350 watts) --, therefor.

In column 8, line 39, delete "50," and insert -- 50 --, therefor.

Signed and Sealed this
Twenty-eighth Day of April, 2015

Michelle K. Lee
*Director of the United States Patent and Trademark Office*